(12) United States Patent
Baik et al.

(10) Patent No.: US 6,949,063 B2
(45) Date of Patent: Sep. 27, 2005

(54) AUTOMATIC BALANCE ADJUSTING CENTRIFUGAL APPARATUS

(75) Inventors: Dou-Ha Baik, Gyunggi-do (KR); Heui-Geun Ryu, Seoul (KR)

(73) Assignee: Hanlab Corporation, Seoul (KR)

( * ) Notice: Subject to any disclaimer, the term of this patent is extended or adjusted under 35 U.S.C. 154(b) by 207 days.

(21) Appl. No.: 10/416,521

(22) PCT Filed: Apr. 1, 2002

(86) PCT No.: PCT/KR02/00568

§ 371 (c)(1),
(2), (4) Date: May 23, 2003

(87) PCT Pub. No.: WO02/083317

PCT Pub. Date: Oct. 24, 2002

(65) Prior Publication Data

US 2004/0018927 A1 Jan. 29, 2004

(30) Foreign Application Priority Data

Apr. 2, 2001 (KR) .......................... 2001-17367
Mar. 29, 2002 (KR) .......................... 2002-17498

(51) Int. Cl.$^7$ ............................. B04B 9/14; B04B 13/00
(52) U.S. Cl. .............................. 494/1; 494/10; 494/20; 494/82; 74/573 R
(58) Field of Search ..................... 494/1, 10, 12, 494/20, 33, 82, 84; 68/23.1, 23.2; 74/573 R; 210/85, 144; 73/457–458

(56) References Cited

U.S. PATENT DOCUMENTS

| | | | | |
|---|---|---|---|---|
| 3,679,130 A | * | 7/1972 | Mayo et al. | 74/573 R |
| 3,692,236 A | * | 9/1972 | Livshitz et al. | 74/573 R |
| 3,762,635 A | * | 10/1973 | Hankey | 74/573 R |
| 3,834,613 A | * | 9/1974 | Hankey | 494/16 |
| 3,921,898 A | * | 11/1975 | Finkel | 494/82 |
| 4,079,882 A | * | 3/1978 | Mizuyoshi et al. | 494/84 |
| 4,099,667 A | * | 7/1978 | Uchida | 494/82 |
| 4,157,781 A | * | 6/1979 | Maruyama | 494/20 |
| 4,449,966 A | * | 5/1984 | Piramoon | 494/20 |
| 4,919,646 A | * | 4/1990 | Perdriat | 494/82 |
| 5,376,063 A | * | 12/1994 | Greenstein | 494/82 |
| 5,827,168 A | * | 10/1998 | Howell | 494/82 |
| 6,132,354 A | * | 10/2000 | Ohtsu et al. | 68/23.2 |
| 2004/0018927 A1 | * | 1/2004 | Baik et al. | 494/82 |
| 2005/0026765 A1 | * | 2/2005 | Escal | 494/82 |

FOREIGN PATENT DOCUMENTS

| | | | |
|---|---|---|---|
| GB | 2146784 | * | 4/1985 |
| GB | 2359772 | * | 9/2001 |
| JP | 62-4567 | | 1/1987 |
| JP | 63-62563 | * | 3/1988 |
| JP | 2-203949 | * | 8/1990 |
| JP | 9-000985 | | 1/1997 |
| JP | 11-262683 | | 9/1999 |
| JP | 2003-236409 | * | 8/2003 |
| KR | 1988-1695 | | 9/1988 |
| KR | 1993-0003504 | | 5/1993 |
| KR | 1993-0007205 | | 8/1993 |

OTHER PUBLICATIONS

English Language Abstract of JP Appln. No. 9–985.
English Language Abstract of JP Appln. No. 62–4567.
English Language Abstract of JP Appln. No. 11–262683.

* cited by examiner

Primary Examiner—Charles E. Cooley
(74) Attorney, Agent, or Firm—Greenblum & Bernstein, P.L.C.

(57) ABSTRACT

A centrifugal machine of automatic balance type is provided for detecting an unbalance in a specimen mounted on a rotor lever before every centrifugal machining, and for moving horizontally the rotor lever according to detected results, maintaining automatic balance, thereby preventing destruction of a specimen due to an unbalance of the rotor, and extending the life of the machine.

19 Claims, 9 Drawing Sheets

FIG. 1

PRIOR ART

FIG.11

AUTOMATIC BALANCE ADJUSTING CENTRIFUGAL APPARATUS

TECHNICAL FIELD

The present invention relates to a centrifugal machine of automatic balance type, and particularly to a centrifugal machine of automatic balance type for detecting a load unbalance between specimens mounted on a rotor lever and for moving horizontally the rotor lever itself or a balance weight member according to detected results, thereby maintaining an automatic balance before every centrifugal machining.

BACKGROUND ART

Figure 1:
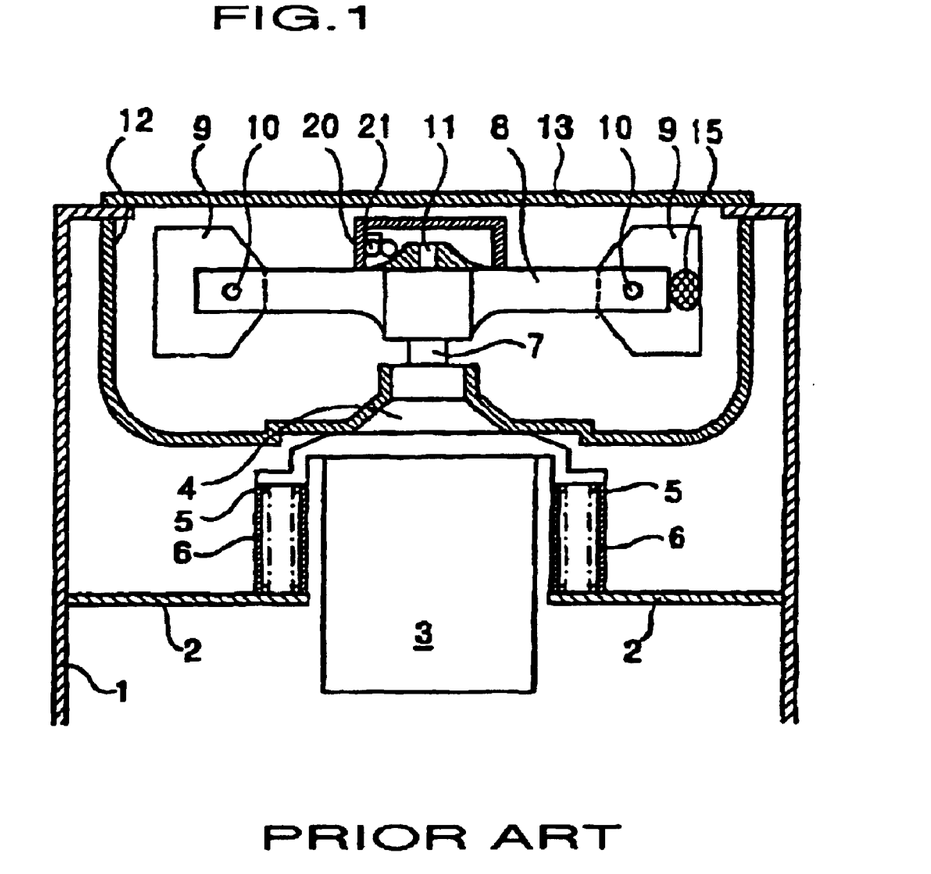
FIG. 1 is a cross-sectional view schematically showing a related centrifugal machine of automatic balance type.

Generally, a centrifugal machine is an apparatus for rotating a rotor containing a specimen in high speed, giving the specimen high centrifugal acceleration, so that a specimen of high density is positioned on an outer layer in a radial direction while a specimen of low density is positioned on an inner layer in a radical direction, thereby separating an ingredient thereof FIG. 1 is a cross-sectional view schematically representing a related centrifugal machine of automatic balance type. As shown in FIG. 1, a related centrifugal machine of automatic balance type is comprised of: a base 2 installed within an outer case 1; a spring 5 installed between a bracket 4 and the base 2 to which a diving motor 3 is mounted, for supporting a rotational part consisting of the diving motor 3 and a rotor, etc. Furthermore, the spring 5 has an indented rubber tube 6 on its outer periphery, so that spring function and attenuation function are provided by means of such spring 5 and rubber tube 6.

In the meantime, a rotor 8 is mounted on an upper portion of a rotational shaft 7 which is supported by a shaft pad in the bracket 4, for free rotation. As a bottom of the rotational shaft 7 is connected to a motor shaft, torque of the driving motor 3 is transferred to the rotor 8. A bucket 9 for accommodating a specimen is mounted on the rotor 8 so that it rotates freely by means of a pin 10. A balancer body 20 of cylindrical shape is fixed on a male screw 11 extended from the rotational shaft 7 in the upper portion of the rotor 8, and a ball 21 is contained within such balancer body 20. In the picture, reference numerals 12, 13, 15 represent a chamber, a chamber door, an unbalance mess, respectively.

The related centrifugal machine of automatic balance type having a constitution as mentioned above, adjusts a ratio of a ball 21 radius to a radius of the cylinder constituting the balancer body 20, distance between a center of the cylinder and a center of rotation, and relation between a concave groove within the cylinder and a half width, thereby correcting unbalance due to a load difference between specimens contained in the bucket 9. More details are described in Japanese Laid-Open Application No. 11-262683 (publication date: Sep. 28, 1999). Accordingly, description thereof is omitted.

According to the foregoing related centrifugal machine of automatic balance type, an unbalance generated from a load difference between specimens that is within a predetermined range can be corrected automatically, but in case of centrifugal machining a specimen beyond such range, a problem that there is no safety device for protecting a specimen and a centrifugal machine. In other words, whenever using a centrifugal machine, a user should determine whether there is a problem in operating the machine before using the machine. If a user does not pay a proper attention like this, an excessive vibration may be generated in a rotational shaft and a specimen is destroyed, and in worst case, a bearing and a driving part including a motor may be broken down, so that life of a centrifugal machine is reduced

DISCLOSURE OF THE INVENTION

The present invention has been made to solve the above mentioned problems and, therefore, it is an object of the present invention to provide a centrifugal machine of automatic balance type for detecting an unbalance in a specimen mounted on a rotor lever before every centrifugal machining, and for moving horizontally the rotor lever itself or a balance weight member according to detected results, maintaining an automatic balance, thereby preventing destruction of a specimen due to an unbalance of the rotor and extending life of the machine.

It is another object of the present invention to provide a centrifugal machine of automatic balance type for displaying a status of impossibility that automatic balance condition is not maintained due to a severe load unbalance so that a user recognizes the status, thereby preventing destruction of a specimen and extending life of the machine.

According to an aspect of the invention to achieve the above objects of the present invention, it is provided a centrifugal machine of automatic balance type comprising: more than one rotor lever, to both ends of which a specimen is hooked; a rotor for supporting the rotor lever so that it moves horizontally; a lever moving means mounted within the rotor, for moving horizontally the rotor lever an central line of rotation of the rotor; a load detecting means for detecting loads weighed on both the ends of the rotor lever, a centrifugal motor for rotating the rotor; an electrical connection means for connecting or disconnecting the load detecting means and the lever moving means to and from an external electrical circuit of the rotor, and a controlling means for controlling the electrical connection means so as to connect electrically the external electrical circuit to the load detecting means and the lever moving means, for calculating loads weighed on both the ends of the rotor lever by means of a detected signal provided from the load detecting means, and for controlling the lever moving means so that centrifugal forces exerted on both the ends of the rotor lever reach a balance.

In the foregoing constitution, the load detecting means may be comprised of a strain gauge or a pressure sensor. Also, the lever moving means may be comprised of a lever moving motor; a worm connected to the lever moving motor in an axial combining manner; a worm wheel engaged with the worm; a pinion connected to the worm wheel in a coaxial combining manner, and a rack formed lengthwise on the rotor lever, engaged with the pinion.

In the meantime, in case that the rotor lever is two, an intersecting concave groove of a width greater than a width of the rotor lever is formed on an intersecting portion so that rotational plane of each rotor lever lies on the same plane, and the lever moving means may be installed in an upper housing and a lower housing of the rotor, respectively.

The electrical connection means may be comprised of a wiring layer exposed to the rotational shaft of the rotor, with electrically connected to the load detecting means and the lever moving means; a wiring contact plate for coming in contact with the wiring layer only when an external force is applied; and a solenoid for applying or removing an external force to the wiring contact plate.

Furthermore, the electrical connection means is further comprised of a displaying means for giving a warning in case that a load difference between both ends of the rotor lever exceeds a predetermined value. In case that the load difference exceeds the predetermined value as a result of the load calculation, the controlling means controls to drive the displaying means, thereby preventing centrifugal machining under inadequate condition of excess load difference.

According to another aspect of the present invention, it is provided a centrifugal machine of automatic balance type comprising: more than one rotor lever, on both ends of which a specimen is mounted; a rotor to which the rotor lever is fixed; a balance weight member installed on a center portion of the rotor lever, for being able to move horizontally; a weight member moving means mounted within the rotor, for moving horizontally the balance weight member on a central line of rotation of the rotor; a load detecting means installed on the rotor lever, for detecting loads weighed on both the ends of the rotor lever; a centrifugal motor for rotating the rotor; an electrical connection means for connecting or disconnecting the load detecting means and the weight member moving means to and from an external electrical circuit of the rotor; and a controlling means for controlling the electrical connection means so as to connect electrically the external electrical circuit to the load detecting means and the weight member moving means, for calculating loads weighed on both the ends of the rotor lever by means of a detected signal provided from the load detecting means, and for controlling the weight member moving means so that centrifugal forces exerted on both the ends of the rotor lever reach a balance.

BEST MODE FOR CARRYING OUT THE INVENTION

A preferred embodiment of a centrifugal machine of automatic balance type according to the present invention will now be described with reference to the accompanying drawings. The matters defined in the description such as a detailed construction and elements of a circuit are nothing but the ones provided to assist in a comprehensive understanding of the invention. Thus, it is apparent that the present invention can be carried out not limited to those defined matters. Also, well-known functions or constructions are not described in detail since they would obscure the invention in unnecessary detail.

Figure 2:
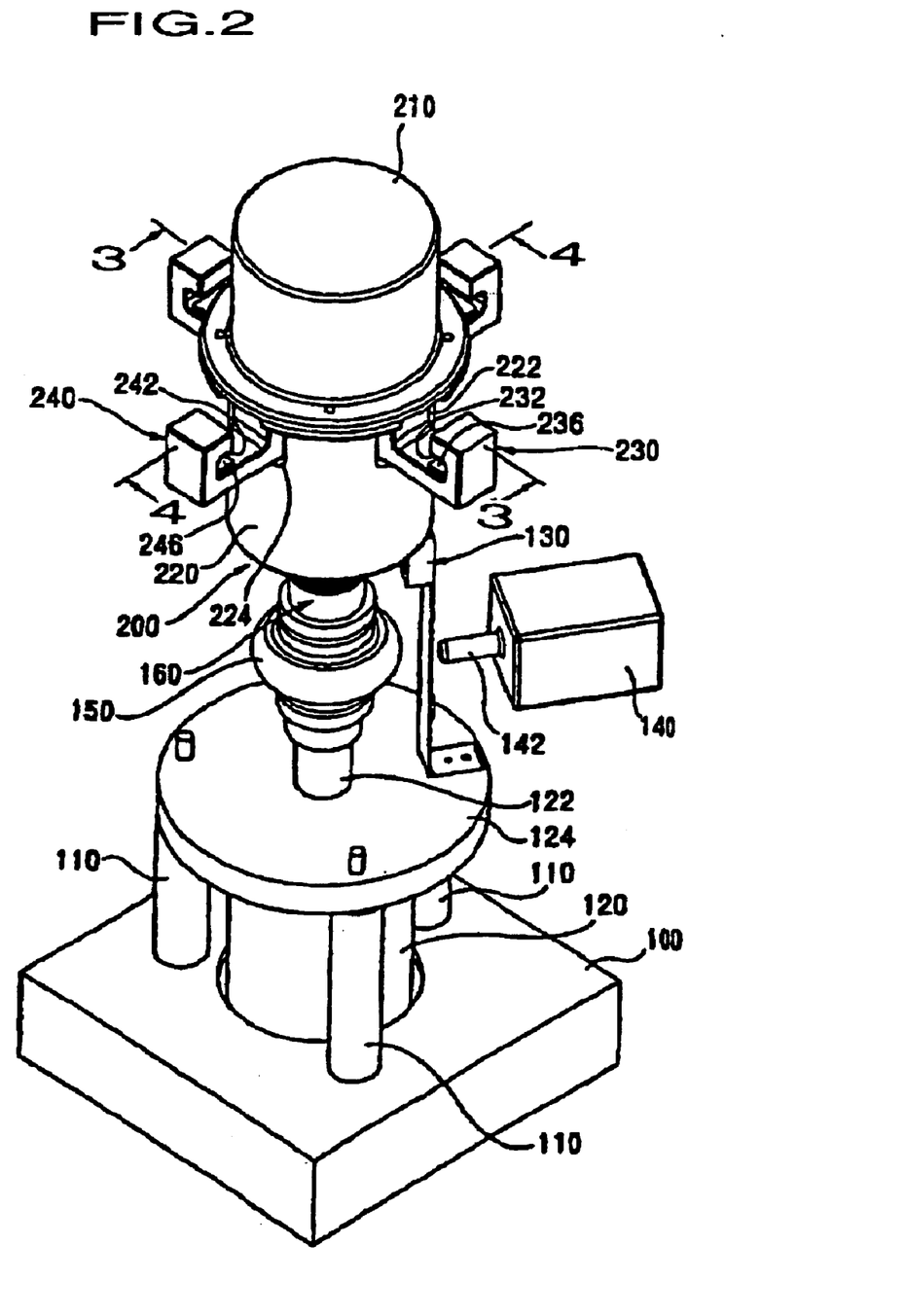
FIG. 2 is a perspective view schematically showing appearance of a centrifugal machine of automatic balance type according to one embodiment of the present invention.

FIG. 2 is a perspective view schematically showing appearance of a centrifugal machine of automatic balance type according to one embodiment of the present invention, taking an example where two rotor levers are adopted. As shown in FIG. 2, a centrifugal machine of automatic balance type according to one embodiment of the present invention is roughly comprised of a base 100; a centrifugal motor 120 supported by the base 100; a rotor 200 connected to the centrifugal motor in an axial combining manner and equipped with rotor levers 230,240; a wiring contact plate 130 for connecting with an electrical circuit part in an inside of the rotor 200; and a solenoid 140 for attaching to or being detached from the wiring contact plate 130.

In the foregoing constitution, a plurality of vibration absorbing members 110 is installed between an upper plate 124 of the centrifugal motor 120 and the base 100, so that the centrifugal motor 120 is hung by the vibration absorbing members 110 and supported accordingly. Vibration generated upon centrifugal machining is absorbed and attenuated by such vibration absorbing members 10. The vibration absorbing member 110 may be, for example, comprised of a spring and a rubber tube inserted on an outer periphery of the spring as illustrated in a centrifugal machine of FIG. 1.

In the meantime, a motor shaft 122 of the centrifugal motor 120 and a rotational shaft (not shown) of the rotor 200, for example, are combined by means of a flexible coupling 150 such as an universal joint (not shown). Also, on a appropriate position in the rotational shaft of the rotor, for example, on an upper periphery of the flexible coupling 150, a slip ring 160 is installed, where a wiring layer (not shown) connected to the electrical circuit part in the inside of the rotor 200 is arranged and exposed. By such structure of the slip ring 160, an electrical wiring in and outside of the rotor 200 can be touched and separated without being twisted. For a base layer of the slip ring 160, durable insulating material such as tetron, vinyl chloride, ceramic or silicon may be used. Metallic wiring layers are arranged up and down as many as necessary, forming cocentric circles on such base layer (Refer to FIG. 3).

In the meantime, the rotor 200 is configured such that two rotor levers 230 and 240 lie at right angles each other in insides of an upper housing 210 and a lower housing 220. For such configuration, for example, four lever guiding holes 222 and 224 intersecting perpendicularly each other are formed on an outer periphery of the lower housing 220, and the rotor levers 230 and 240 are moved horizontally for balance maintenance, with passing through and being inserted to the lever guiding holes 222 and 224.

Reference numerals 232 and 242 in the picture represent a hooking portion, respectively, formed on both the ends of the rotor lever 230 and 240, to which a bucket (not shown) containing a specimen is hooked and reference numerals 236,246 represent a strain gauge stuck on maximum bending stress point in both the ends of the respective rotor lever 230 and 240, for detecting unbalance in loads weighed on both the ends of the rotor lever 230 and 240. A plurality of strain gauges 236 and 246 may be installed on one end of the respective rotor lever 230 and 240.

In such structure, when strain is generated on both the ends of respective rotor lever 230 and 240 due to mounting of the bucket (not shown) containing a specimen, resistance value of a metal resistance wire in the strain gauges 236 and 246 stuck on the respective rotor lever, begin to change. Therefore, when voltage is applied on the strain gauge 236 and 246, voltage change is obtained in proportional to resistance change of the strain gauge 236 and 246 which corresponds to the strain generated in the rotor lever 230 and 240 and load difference of a specimen weighed on both the ends of the rotor 230 and 240 could be detected by amplification of the above voltage change.

In the meantime, the wiring contact plate 130 is configured such that it comes into one-to-one contact with the wiring layer formed on the slip ring 160. When external force by a push rod 142 in an end of the solenoid 140 is not applied, the wiring contact plate 130 remains isolated from the wiring layer by a spring (not shown) of less elastic force than the external force by the push rod 142. But, when external force by the push rod 142 is applied on the wiring contact plate 130, the wiring contact plate 130 comes into contact with the wiring layer, a detecting signal from the electrical circuit part in the inside of the rotor 200 is transmitted to a controlling part described below, and command from the controlling part is transmitted to the electrical circuit part in the inside of the rotor 200.

Figure 3:
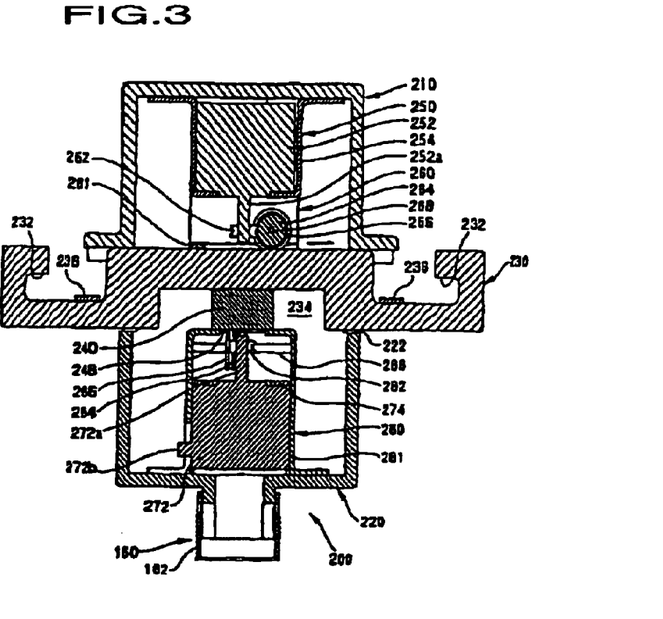
FIG. 3 is a cross-sectional view for a rotor, taken along line 3—3 of FIG. 2.
Figure 4:
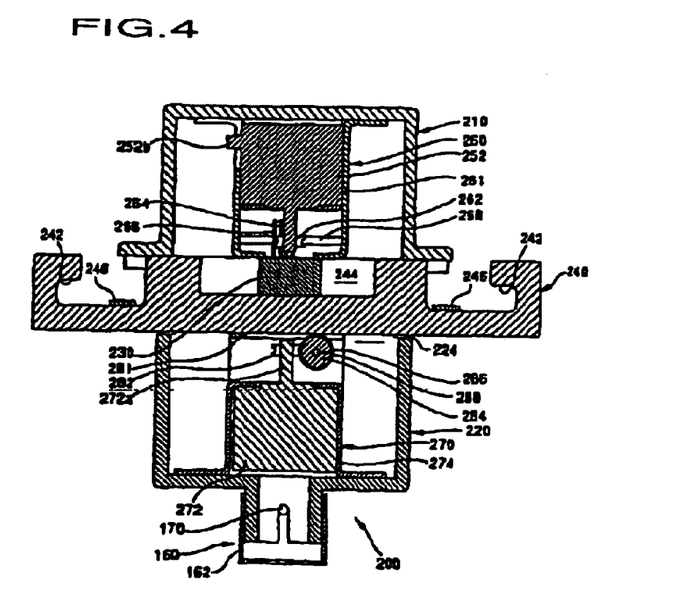
FIG. 4 is a cross-sectional view for a rotor, taken along line 4—4 of FIG. 2.
Figure 5:
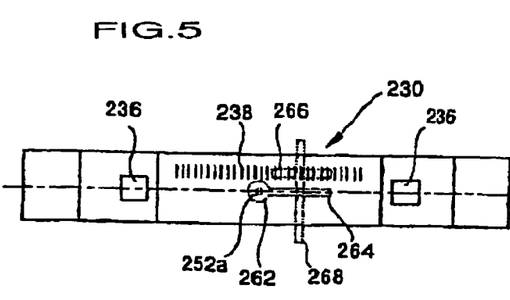
FIG. 5 is a top, plan view for a rotor lever shown in FIG. 3.

FIG. 3 is a cross-sectional view for a rotor, taken along line A—A of FIG. 2 and FIG. 4 is a cross-sectional view for a rotor, taken along line B—B of FIG. 2, and FIG. 5 is a top, plan view for a rotor lever shown in FIG. 3. As shown in FIG. 3 through FIG. 5, two rotor levers 230 and 240 lie at right angles each other, across the lever guiding holes 222 and 224 of the lower housing 220, and in order to save space, intersecting concave grooves 234 and 244 facing each other are formed respectively in an intersecting portion of the two rotor lever 230 and 240 upon installation. Namely, one rotor lever 230 (called an upper rotor lever in order for easy discrimination hereinafter) has the concave groove 234 in its lower side and the other rotor lever 240 (called an lower rotor lever hereinafter) has the concave groove 244 in its upper side. Further, a width of the respective intersecting groove 234 and 244 should be appropriately wider than that of the respective rotor lever 230 and 240, for allowing horizontal movement of the upper rotor lever 230 and the lower rotor lever 240. The upper rotor lever 230 has a rack 238 on its upper side as shown in FIG. 5.

A motor assembly 250 and a gear box 260 for moving horizontally the upper rotor lever 230 could be installed in an inside of the upper housing 210. First of all, the motor assembly 250 could be comprised of a lever moving motor 252 and a supporting bracket 254. More specifically, the motor assembly 250 is fixed in the upper housing by the supporting bracket 254 so that a motor shaft 252a may be positioned downward from the central line of rotation of the rotor 200.

The gear box 260 is comprised of a worm 262 connected to the motor shaft 252a and a worm wheel 264 engaged with the worm 262 by an appropriate gear ratio, and pinion 266 is installed on the same axel of the worm wheel 264, leaving predetermined interval. Such pinion 266 is engaged with the rack 238 on the upper rotor lever 230. Like the foregoing constitution, by adopting the worm 262 and the worm wheel 264, the worm wheel 264 cannot rotate the worm 262, whereby unwanted movement of the rotor lever 230 by centrifugal force due to high speed rotation of the rotor 200, could be prevented.

In the meantime, a motor assembly 270 and a gear box 280 for moving horizontally the lower rotor lever 240 could be installed in an inside of the lower housing 220. First of all, the motor assembly 270 could be comprised of a lever moving motor 272 and a supporting bracket 274. More specifically, the motor assembly 270 is fixed in the lower housing by the supporting bracket 274 so that a motor shaft 272a may be positioned upward from the central line of rotation of the rotor 200.

The gear box 280 is comprised of a worm 282 connected to the motor shaft 272a and a worm wheel 284 engaged with the worm 282 by an appropriate gear ratio, and pinion 286 is installed on the same axel of the worm wheel 284, leaving predetermined interval. Such pinion 286 is engaged with the rack (not shown) formed on an lower side of the lower rotor lever 240.

Reference numerals 252b and 272b in FIG. 3 through FIG. 5 represent a power supply terminal of the lever moving motor 252 and 272, reference numerals 261 and 281 represent a supporting bracket for the gear box 280, and reference numerals 268 and 288 represent a shaft pin installed on the respective supporting bracket 261 and 281, for rotating with the respective worm wheel 264 and 284 and respective pinion 266 and 286 mounted on the shaft. Reference numeral 170 represents a combining pin 170 for combing the rotational shaft connected by the centrifugal motor 120, more specifically, the centrifugal motor 120 and the flexible coupling 150, with the rotor 200 and the reference numeral 162 represents a wiring layer formed on the slip ring 160.

Figure 6:
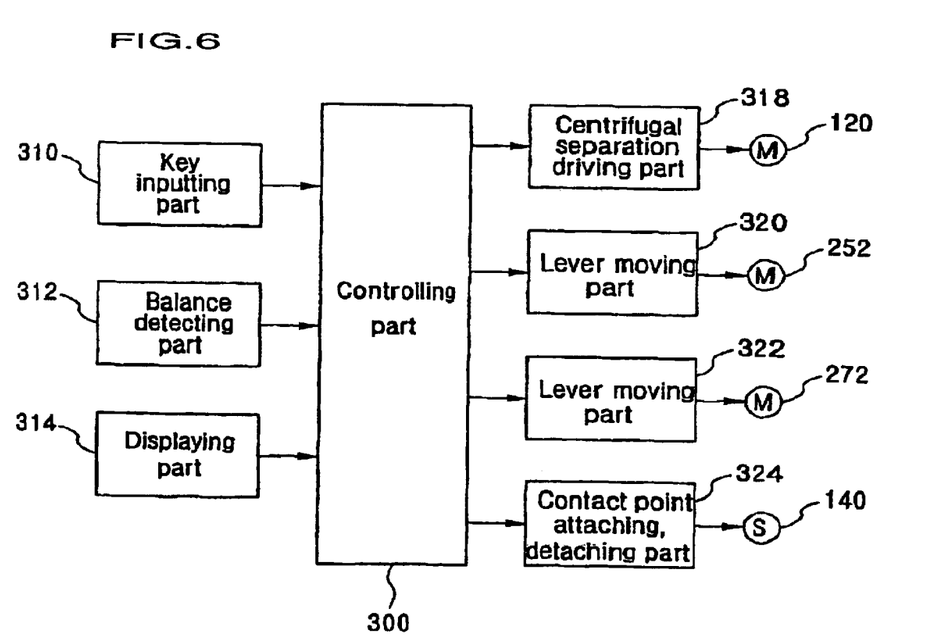
FIG. 6 is a block diagram illustrating electrical constitution for a centrifugal machine of automatic balance type according to the present invention.

FIG. 6 is a block diagram illustrating electrical constitution for a centrifugal machine of automatic balance type according to the present invention. As shown in FIG. 6, electrical constitution for a centrifugal machine of automatic balance type according to the present invention is comprised of a key inputting part 310 for selecting and receiving various functions provided to the machine; a balance detecting part 312 having the strain gauges 236 and 246 and neighboring circuit elements, for detecting balance state of specimen loads weighed on both the ends of the rotor levers 230 and 240; a centrifugal separation driving part 318 for driving the centrifugal motor 120, rotating the rotor 200; lever moving parts 320 and 322 for driving the lever moving motors 252 and 272, moving horizontally the rotor levers 230 and 240; a contact point attaching, detaching part 324 for establishing electrical system for driving the solenoid 140 so that the wiring contact plate 130 comes into contact with the wiring layer 162, thereby receiving a detected signal from the balance detecting part 312, delivering a control command to the lever moving part 320 and 322; and a controlling part 300 for controlling overall operation of the machine.

In the foregoing constitution, for the lever moving motors 252 and 272, stepping motor in which precise control for a rotational angle is possible could be used and servo motor also could be used. Further, a formula for computing a moving distance of the rotor lever 230,240 based on a rotational angle of the lever moving motors 252 and 272, and a moving distance based on a load difference for a centrifugal force balance, is contained in the controlling part 300(Refer to a mathematical formula 1 described below). Reference numeral 314 in the picture, represents a displaying part for giving a user a warning in case that an unbalance of a specimen load is too remarkable to be overcome by the present invention.

Operation for a centrifugal machine of automatic balance type according to the present invention, will now be described herein below in detail.

First of all, when a user inputs a balance detecting function by means of the key inputting part 310 while mounting a bucket containing a specimen at hooking portions 232 and 242 of the rotor levers 230 and 240, the controlling part 300 receives this input, then gives a command to the contact point attaching, detaching part 324, driving the solenoid 140, thereby bringing the wiring contact plate 130 into contact with the wiring layer 162. After that, the balance detecting part 312 transmits detected results of the strain gauges 236 and 246 to the controlling part. 300 via the wiring layer 162 and the wiring contact plate 130, and the controlling part 300 receives this results, computing an unbalance amount between both the ends of the respective rotor lever 230 and 240 and an horizontal moving amount of the rotor lever 230 and 240 based on the unbalance amount, using the following formulae, then giving a moving command to the lever moving part 320 and 322 for achieving a balance in centrifugal force.

Formula 1

$$f_1 = m_1 r_1 \omega^2$$

Formula 2

$$f_2 = m_2 r_2 \omega^2$$

Here, $f_1$ and $m_1$ represent centrifugal force and the total load of specimens weighed on one end of either rotor lever 230, respectively, while $f_2$ and $m_2$ represent centrifugal force and the total load of specimens weighed on the other end of the same rotor lever 230. Further, $r_1$ and $r_2$ represent a distance between a rotational center and a specimen, respectively, and $\omega$ represents angular velocity. The foregoing is true of the other rotor lever 240.

From the above two mathematical formulae, a formula 3 for moving horizontally the rotor lever is derived as follows.

Formula 3

$$m_1 r_1 = m_2 r_2$$

In the meantime, upon completion of moving the rotor lever 230 and 240, namely, when a balance is maintained, the controlling part 300 gives a command to the contact point attaching, detaching part 324 so as to retreat the push rod 142 of the solenoid 140, thereby isolating the wiring contact plate 130 from the wiring layer 162. At this state, the controlling part 300 drives the centrifugal motor 120, thereby performing centrifugal separation with the balance maintained.

Figure 7:
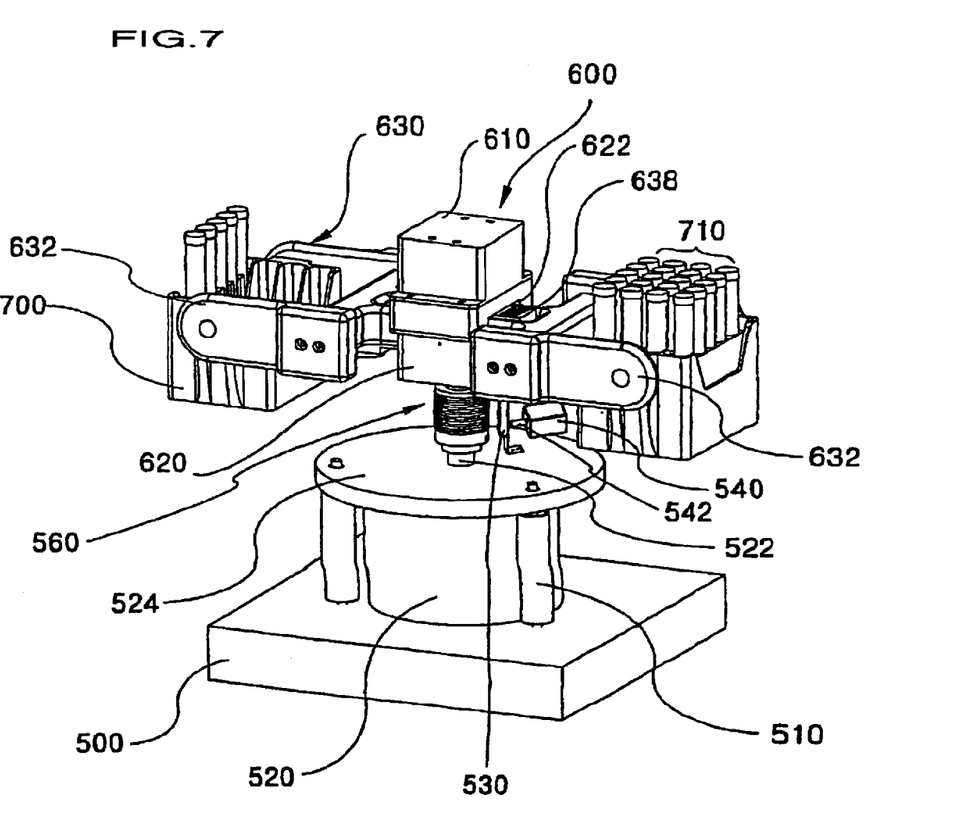
FIG. 7 is a perspective view schematically showing appearance of a centrifugal machine of automatic balance type according to another embodiment of the present invention.
Figure 8:
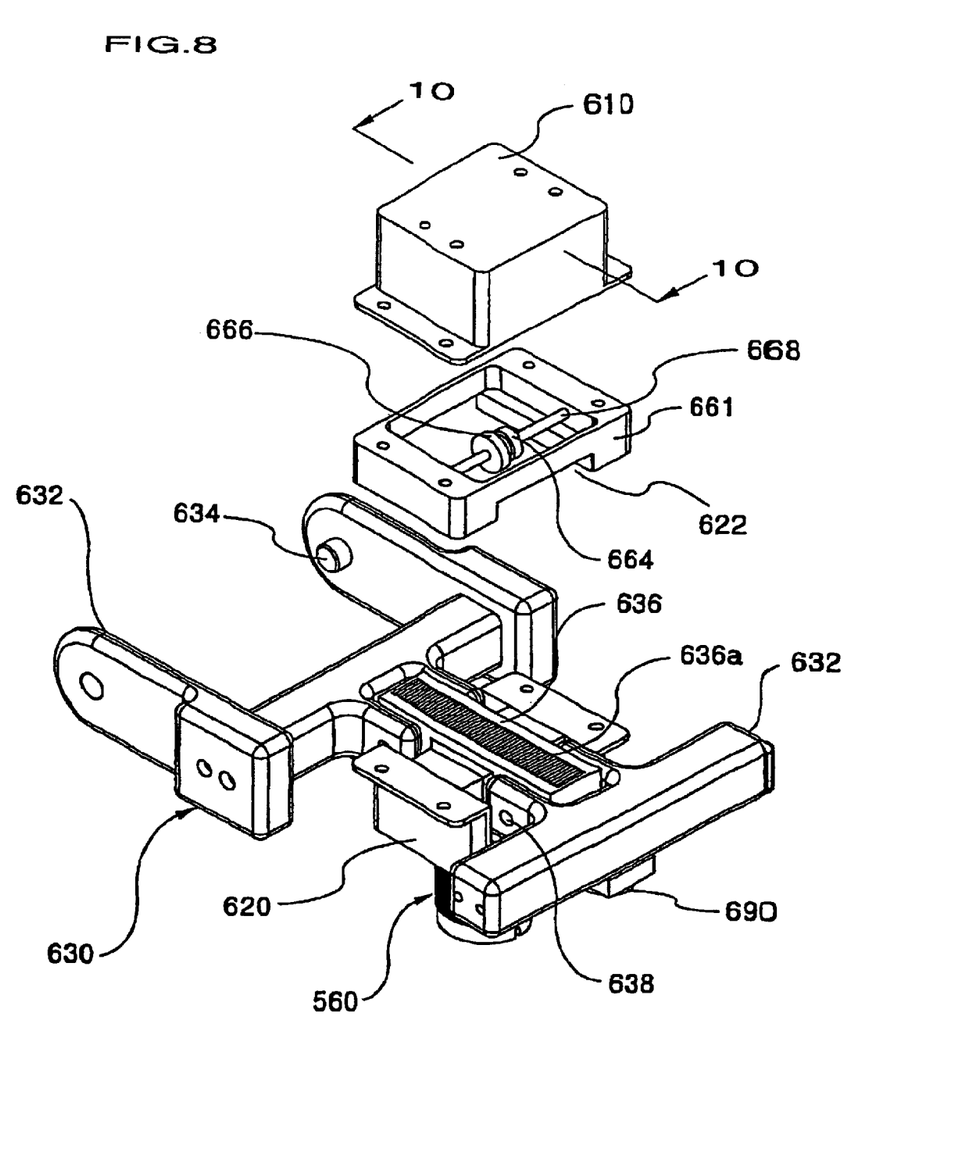
FIG. 8 is an exploded, perspective view for a rotor seen from upper side with some parts removed in FIG. 7.
Figure 9:
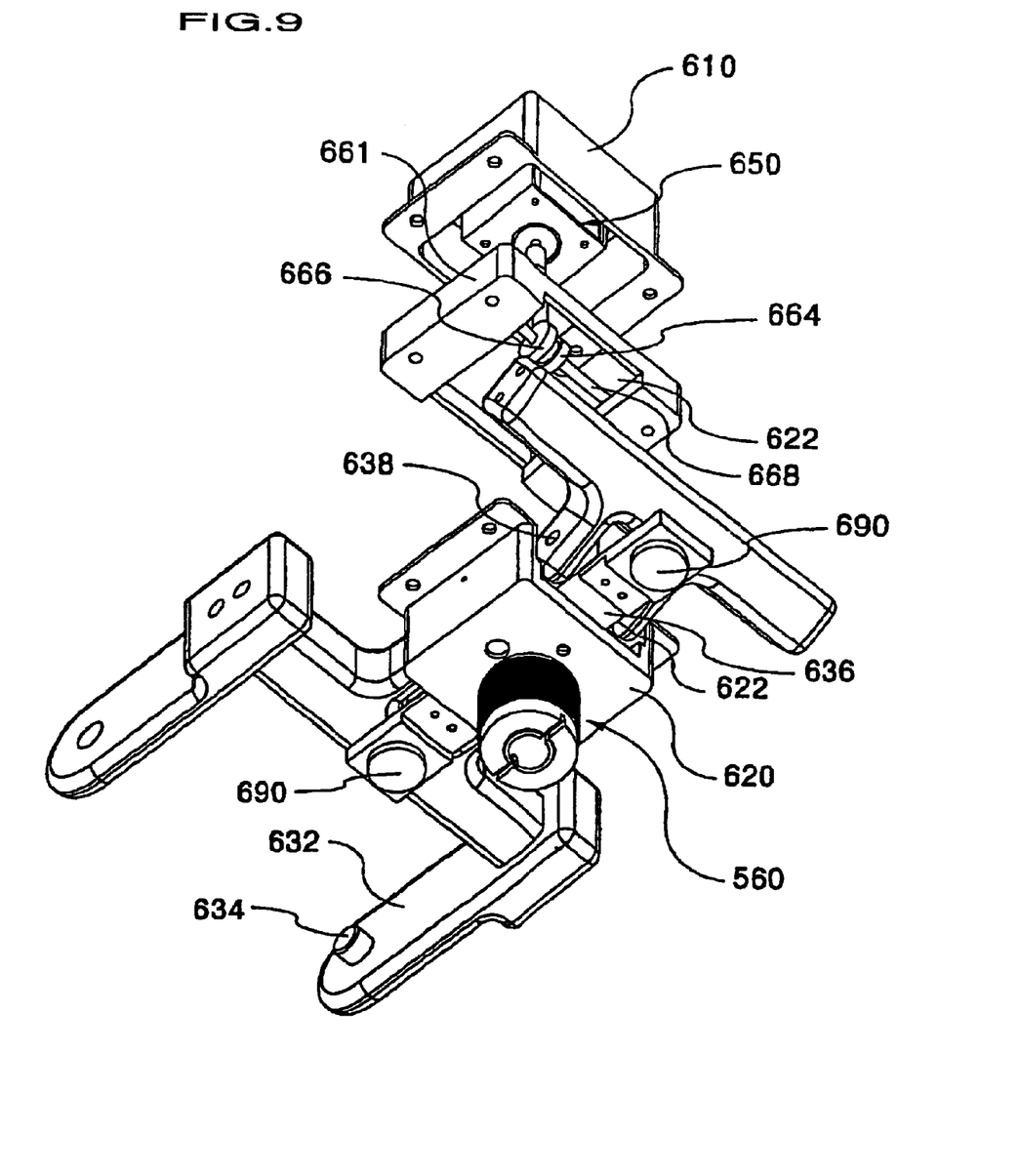
FIG. 9 is an exploded, perspective view for a rotor seen from bottom side with some parts removed in FIG. 7.
Figure 10:
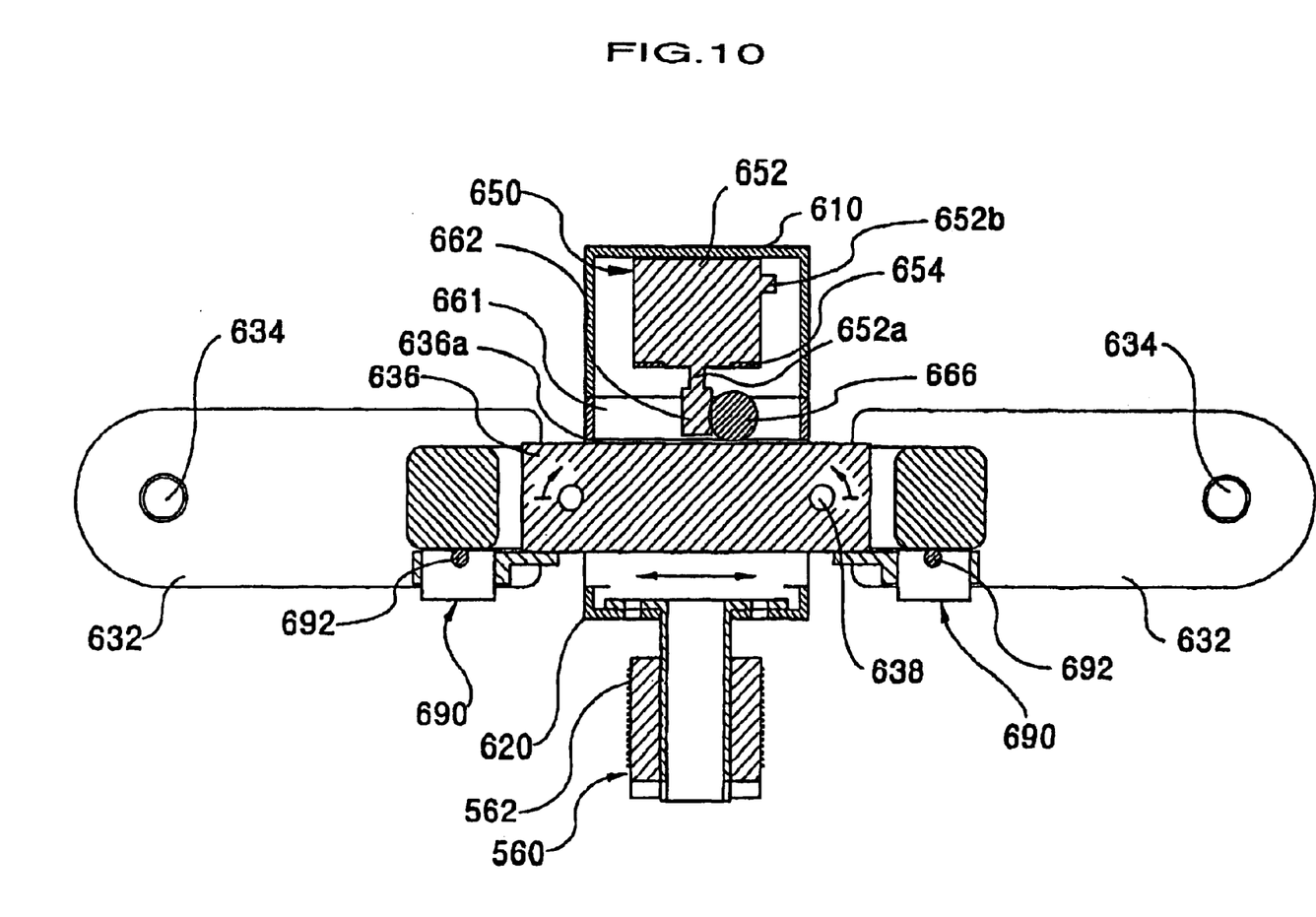
FIG. 10 is a cross-sectional view for a rotor, taken along line 10—10 of FIG. 8.

FIG. 7 is a perspective view schematically showing appearance of a centrifugal machine of automatic balance type according to another embodiment of the present invention, in which an example adopting one rotor lever is shown. FIG. 8 is an exploded, perspective view for a rotor seen from upper side with some parts removed in FIG. 7, and FIG. 9 is an exploded, perspective view for a rotor seen from bottom side with some parts removed in FIG. 7, and FIG. 10 is a cross-sectional view for a rotor, taken along line C—C of FIG. 8.

As illustrated in FIG. 7 through FIG. 10, a centrifugal machine of automatic balance type according to another embodiment of the present invention is roughly comprised of a base 500; a centrifugal motor 520 supported by the base 500; a rotor 600 having a rotor lever 630, connected to the centrifugal motor 520 in an axial combining manner; a wiring contact plate 630 for connecting with an electrical circuit part in an inside of the rotor 600; and a solenoid 640 for attaching and detaching the wiring contact plate 630.

In the foregoing constitution, a plurality of vibration absorbing members 510 is installed between an upper plate 524 of the centrifugal motor 520 and the base 500, so that the centrifugal motor 520 is hung by the vibration absorbing members 510 and supported accordingly. Vibration generated upon centrifugal machining is absorbed and attenuated by such vibration absorbing members 510.

On an upper periphery of a motor shaft 522, a slip ring 560 is installed where the wiring layer (not shown) connected to the electrical circuit part in the inside of the rotor 600 is arranged and exposed. By such structure of the slip ring 560, an electrical wiring in and outside of the rotor 600 can be touched and separated without being twisted.

In the meantime, the rotor 600 is configured such that one rotor lever 630 is installed in insides of an upper housing 610 and a lower housing 620. But, as the present embodiment adopts a pressure sensor of direct application type 690 (FIG. 8) for use as a load detecting means, the rotor lever 630 is comprised of separate assemblies, not single member as the embodiment shown in FIG. 2. Namely, the rotor lever 630 is comprised of a lever central body 636 positioned on a central portion, and two rotational arms 632 connected to both ends of such lever central body 636 by means of a hinge 638, for rotating up and down. The rotational arm 632 on both the ends of the lever central body 636, has the pressure sensor 690 in its lower portion for detecting a pressure of the rotational arm 632 in a direct application manner, and each rotational arm 632 maintains balanced horizontal state by support of such pressure sensor 690. Reference numeral 692 (FIG. 10) represents a pressure applying ball for distributing uniformly a pressure from the rotational arm 632, to a pressure receiving portion of the pressure sensor 690.

On oppositely faced portions of an upper housing 610 and a lower housing 620, two lever guiding cavities 622 are formed. The rotor lever 630 is moved horizontally for balance maintenance, with passing through and being inserted to the lever guiding cavities 622. Reference numeral 634 (FIG. 8) represents a hooking protuberance formed on both the ends of the rotor lever 630, for combining with a bucket 700 containing a specimen 710 so that the bucket 700 could rotate.

With such constitution, when a difference is generated between measurement values of the pressure sensor 690 in both sides with a specimen mounted on the bucket 700, such difference is detected by the balance detecting part 312, provided to the controlling part 300 shown in FIG. 6, where a load difference between the specimens weighed on both the ends of the rotor lever 630 is calculated, and the rotor lever 630 is moved horizontally according to calculation results thereto, whereby a balance is maintained.

A motor assembly 650 (FIG. 9) for moving horizontally the rotor lever 630, could be installed in an inside of the upper housing 610. First of all, the motor assembly 650 could be comprised of a lever moving motor 652 and a supporting bracket 654. More specifically, the motor assembly 650 is fixed in the upper housing by the supporting bracket 654 so that a motor shaft 652a may be positioned downward from the central line of rotation of the rotor 600.

A worm 662 is connected to the motor shaft 652a in an axial combining manner, then a worm wheel 664 is engaged with the worm 662 by an appropriate gear ratio, and pinion 666 is installed on the same axel of the worm wheel 664, leaving predetermined interval, then the pinion 666 is engaged with the rack 636a formed on the upper side of the lever central body 636. Like the foregoing, by adopting the worm 662 and the worm wheel 664, the worm wheel 664 cannot rotate the worm 662, whereby unwanted movement of the rotor lever 630 by centrifugal force due to high speed rotation of the rotor 600, could be prevented.

The reference numeral 652b represents a power supply terminal of the lever moving motor 652, and 668 represents a shaft pin installed on the supporting bracket 661, for rotating with the worm wheel 664 and pinion 666 mounted on the shaft.

Figure 11:
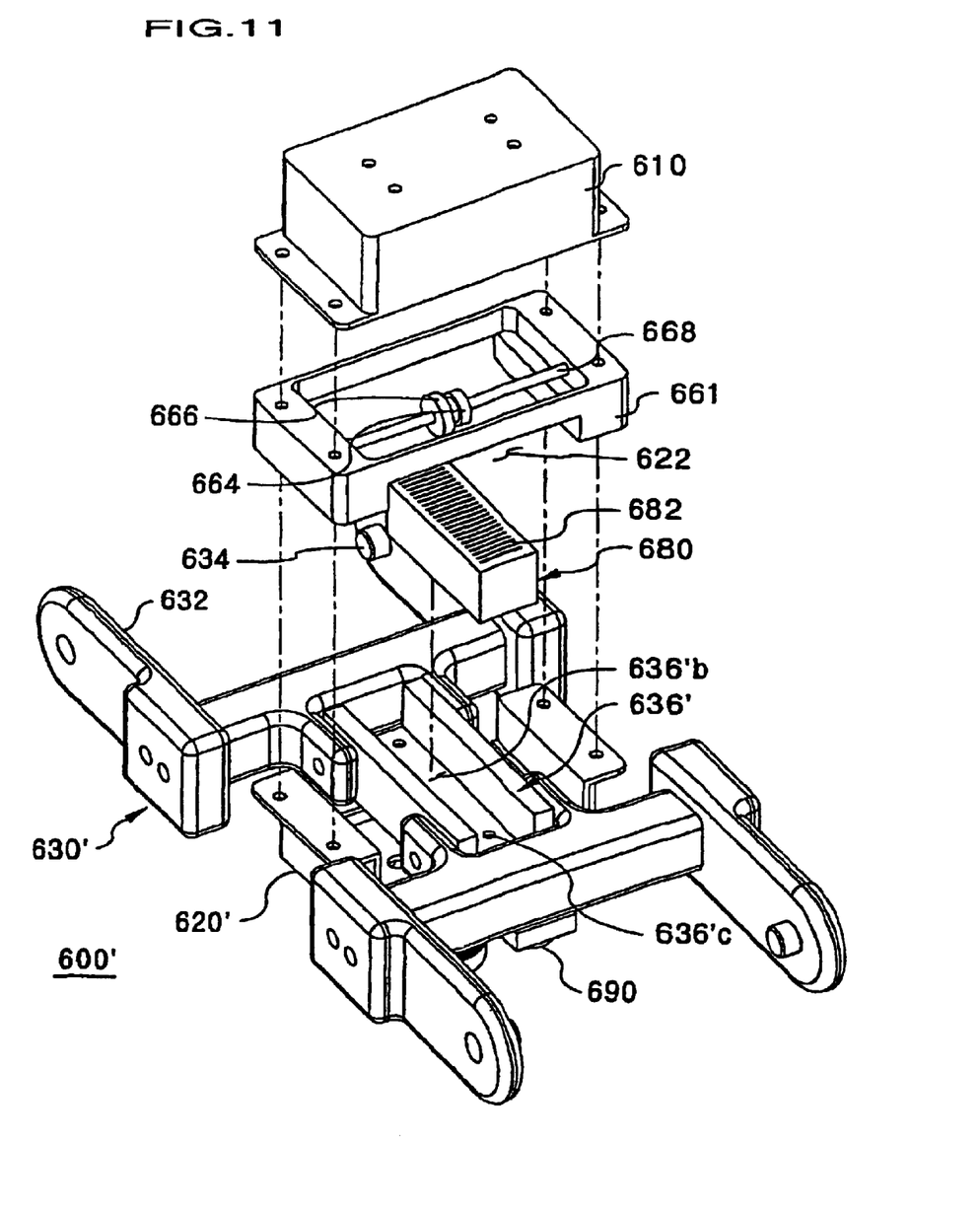
FIG. 11 is an exploded, perspective view for a rotor seen from upper side with some parts of a centrifugal machine of automatic balance type according to the present invention taken out.

FIG. 11 is an exploded, perspective view for a rotor seen from upper side with some parts of a centrifugal machine of automatic balance type according to the present invention taken out, and the same reference numerals are given to the same constituents as those shown in FIG. 8, detailed description thereto is omitted. As shown in FIG. 11, the present embodiment maintains an automatic balance by moving horizontally a balance weight member 680 which forms a separate body from the rotor lever 630' instead of moving the rotor lever itself 630'. Though not shown in the picture, the present embodiment could have the same constitution in the rest parts as the constitution of the embodiment shown in FIG. 7 through FIG. 10, with difference only in the constitution related to the above separate balance weight member 680.

In the meantime, for such configuration, the present invention is comprised of a rotor lever 630' being fixed in the rotor (not shown); a moving guiding groove 636'b being formed, in parallel with both the rotational arms 632, on the lever central body 636'; a balance weight member 680 of, for example, a rectangular shaped stick being inserted into such moving guiding groove 636b'. Further, a rack 682 is formed on the upper side of the balance weight member 680, for moving horizontally the balance weight member 680 within the moving guiding groove 636'b, and a pinion 666 is engaged with such rack 682.

Reference numeral 636'c represents a bolt fastening bole to which a bolt for fixing the rotor lever 630' in the rotor is fastened. Preferably, the bolt fastening hole 636'c is formed lest the fastened bolt should be projected from a bottom side of the moving guiding groove 636'b.

With such constitution, when a difference is generated between measurement values of the pressure sensor 690 in both sides with specimens mounted on the bucket 700, such difference is detected by the balance detecting part 312, then provided to the controlling part 300 shown in FIG. 6. After that, the controlling part 300 calculates a load difference between the specimens weighed on both the ends of the rotor lever 630', using a detected signal provided from the balance detecting part 312, then calculating moving distance necessary according to above calculation results, moving horizontally the balance weight member 680 in a predetermined direction as necessary amount, thereby maintaining an automatic balance.

Formula 4

$$m_1 r + dm\Delta r = m_2 r - dm\Delta r$$

In the above mathematical formula 4, $m_1$, $m_2$ represent loads weighed on both the rotational arms 632 of the rotor lever 630', respectively, r represents a rotational radius of the each rotational arm 632, dm represents a mess of the balance weight member 680, and $\Delta r$ represents a moving distance of the balance weight member 680.

To achieve the foregoing, the controlling part 300 could determine a moving distance ($\Delta r$) with reference to a table stored in its self contained memory, regarding a moving direction and distance of the balance weight member 680 according to a difference in measurement values of pressure sensors in both the sides, or could determine a moving distance ($\Delta r$) by calculating directly a moving direction and moving distance using the formula 4.

In the meantime, according to the present embodiment, the lever moving part 320 will be changed to a weight member moving part in its name.

Though the invention has been shown and described with reference to a certain preferred embodiment thereof, it will be understood by those skilled in the art that various changes in form and details may be made therein without departing from the spirit and scope of the invention as defined by the appended claims.

For example, contrary to the embodiment mentioned above, three or more rotor levers could be installed. Further, a load difference could be detected by a rod cell stuck on appropriate portion of both the ends of the rotor lever, and the wiring layer could be installed on other portion, not the slip ring, for example on a periphery of the upper housing or the lower housing, or a surface of an upper side of the upper housing. Also, instead of the worm and worm wheel for moving the rotor lever, a bevel gear or other kind of gear could be adopted.

INDUSTRIAL APPLICABILITY

As described in the foregoing, a centrifugal machine of automatic balance type according to the present invention, corrects an unbalance in centrifugal force generated by a load difference of specimens, by moving horizontally the rotor lever itself or the balance weight member, thereby preventing vibration during centrifugal machining, extending life of the centrifugal machine accordingly. Further, the present invention not only carries out centrifugal separation of a specimen accurately, quickly, but also protects a specimen from being destroyed. Still further, as the centrifugal machine informs a user whether the centrifugal machine can operate within a limited load difference range, a user need not to measure a load of a specimen or adjust the number of specimens, whereby operation time necessary for centrifugal machining is reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A centrifugal machine of automatic balance type comprising:

at least a rotor lever, to both ends of which a specimen is hooked;

a rotor for supporting the rotor lever so that it moves horizontally;

a lever moving means mounted within the rotor, for moving horizontally the rotor lever on central line of rotation of the rotor;

a load detecting means installed on the rotor lever, for detecting loads weighed on both the ends of the rotor lever;

a centrifugal motor for rotating the rotor;

an electrical connection means for connecting or disconnecting the load detecting means and the lever moving means to and from an external electrical circuit of the rotor; and a controlling means for controlling the electrical connection mean so as to connect electrically the external electrical circuit to the load detecting means an the lever moving means, for calculating loads weighed on both the ends of the rotor lever by means of a detected signal provided from the load detecting means, and for controlling the lever moving means so that centrifugal forces exerted on both the ends of the rotor lever reach a balance.

2. The centrifugal machine according to claim 1, wherein the load detecting means is comprised of a strain gauge.

3. The centrifugal machine according to claim 2, wherein the electrical connection means is comprised of a wiring layer exposed to the rotational shaft of the rotor, with electrically connected to the load detecting means and the lever moving means; a wiring contact plate for coming in contact with the wiring layer only when an external force is applied; and a solenoid for applying or removing a external force to the wiring contact plate.

4. The centrifugal machine according to claim 3 further comprising:
a displaying means for giving a warning in case that a load difference between both ends of the rotor lever exceeds a predetermined value, wherein the controlling means drives the displaying means in case that the load difference exceeds the predetermined value as a result of calculation of the load.

5. The centrifugal machine according to claim 1, wherein the load detecting means is comprised of a pressure sensor.

6. The centrifugal machine according to claim 5, wherein the electrical connection means is comprised of a wiring layer exposed to the rotational shaft of the rotor, with electrically connected to the load detecting means and the lever moving means; a wiring contact plate for coming in contact with the wiring layer only when an external force is applied; and a solenoid for applying or removing a external force to the wiring contact plate.

7. The centrifugal machine according claim 6 further comprising:
a displaying means for giving a warning in case that a load difference between both ends of the rotor lever exceeds a predetermined value, wherein the controlling means drives the displaying means in case that the load difference exceeds the predetermined value as result of calculation of the load.

8. The centrifugal machine according to claim 1, wherein the lever moving means is comprised of a lever moving motor; a worm connected to the lever moving motor in an axial combining manner; a worm wheel engaged with the worm; a pinion connected to the worm wheel in a coaxial combining manner; and a rack formed lengthwise on the rotor lever, engaged with the pinion.

9. The centrifugal machine according to claim 8, wherein in case that the rotor lever is two, an intersecting concave groove of a width greater than a width of the rotor lever is formed on an intersecting portion so that rotational plane of each rotor lever lies on the same plane, and the lever moving means is installed in an upper housing and a lower housing of the rotor, respectively.

10. The centrifugal machine according to claim 9, wherein the electrical connection means is comprised of a wiring layer exposed to the rotational shaft of the rotor, with electrically connected to the load detecting means and the lever moving means; a wiring contact plate for coming in contact with the wiring layer only when an external force is applied; and a solenoid for applying or removing a external force to the wiring contact plate.

11. The centrifugal machine according to claim 10 further comprising:
a displaying means for giving a warning in case that a load difference between both ends of the rotor lever exceeds a predetermined value, wherein the controlling means drives the displaying means in case that the load difference exceeds the predetermined value as a result of calculation of the load.

12. The centrifugal machine according to claim 8, wherein the electrical connection means is comprised of a wiring layer expose to the rotational shaft of the rotor, with electrically connected to the load detecting means and the lever moving means; a wiring contact plate for coming in contact with the wiring layer only when an external force is applied; and a solenoid for applying or removing a external force to the wiring contact plate.

13. The centrifugal machine according claim 12 further comprising:
a displaying means for giving a warning in case that a load difference between both ends of the rotor lever exceeds a predetermined value, wherein the controlling means drives the displaying means in case that the load difference exceeds the predetermined value as a result of calculation of the load.

14. The centrifugal machine according to claim 1, wherein the electrical connection means is comprised of a wiring layer exposed to the rotational shaft of the rotor, with electrically connected to the load detecting means and the lever moving means; a wiring contact plate for coming in contact with the wiring layer only when an external force is applied; and a solenoid for applying or removing a external force to the wiring contact plate.

15. The centrifugal machine according to claim 14 further comprising:
a displaying means for giving a warning in case that a load difference between both the ends of the rotor lever exceeds a predetermined value, wherein the controlling means drives the displaying means in case that the load difference exceeds the predetermined value as a result of calculation of the load.

16. A centrifugal machine of automatic balance type comprising:
at least a rotor lever on both ends of which a specimen is mounted;
a rotor to which the rotor lever is fixed;
a balance weight member installed on a center portion of the rotor lever, for being able to move horizontally;
a weight member moving means mounted within the rotor, for moving horizontally the balance weight member on a central line of rotation of the rotor;
a load detecting means installed on the rotor lever, for detecting loads weighted on both the ends of the rotor lever;
a centrifugal motor for rotating the rotor;
an electrical connection means for connecting or disconnecting the load detecting means and the weight member moving means to and from an external electrical circuit of the rotor; and
a controlling means for controlling the electrical connection mean so as to connect electrically the external electrical circuit to the load detecting mean and the weight member moving means, for calculating loads weighed on both the end of the rotor lever by means of a detected signal provided from the load detecting means, and for controlling the weight member moving means so that centrifugal forces exerted on both the ends of the rotor lever reach a balance.

17. The centrifugal machine according to claim 16, wherein the weight member moving means is comprised of a weight member moving motor; a worm connected to the weight member moving motor in an axial combining manner; a worm wheel engaged with the worm; a pinion connected to the worm wheel in a coaxial combining manner; and a rack formed lengthwise on the balance weight member, engaged with the pinion.

18. The centrifugal machine according to claim 17 further comprising:

a displaying means for giving a warning in case that a load difference between both ends of the rotor lever exceeds a predetermined value, wherein the controlling means drives the displaying means in case that the load difference exceeds the predetermined value as a result of calculation of the load.

19. The centrifugal machine according to claim 16 further comprising:

a displaying means for giving a warning in case that a load difference between both ends of the rotor lever exceeds a predetermined value, wherein the controlling means drives the displaying means in case that the load difference exceeds the predetermined value as a result of calculation of the load.

* * * * *

UNITED STATES PATENT AND TRADEMARK OFFICE
CERTIFICATE OF CORRECTION

PATENT NO. : 6,949,063 B2  Page 1 of 1
APPLICATION NO. : 10/416521
DATED : September 27, 2005
INVENTOR(S) : D. H. Baik et al.

It is certified that error appears in the above-identified patent and that said Letters Patent is hereby corrected as shown below:

At column 11, line 56, "a" (second occurrence) should be ---an---.

At column 12, line 5, "a" (second occurrence) should be ---an---.

At column 12, line 21, "a" (second occurrence) should be ---an---.

At column 12, line 52, "mean" should be ---means---.

At column 12, line 53, "mean" should be ---means---.

Signed and Sealed this

Fifteenth Day of August, 2006

JON W. DUDAS
*Director of the United States Patent and Trademark Office*